US008234362B2

(12) United States Patent
Lu et al.

(10) Patent No.: US 8,234,362 B2
(45) Date of Patent: *Jul. 31, 2012

(54) SYSTEM AND METHOD FOR GENERATING AND REPORTING COOKIE VALUES AT A CLIENT NODE

(75) Inventors: Victor Lu, Portland, OR (US); Xavier Le Hericy, Portland, OR (US); Elijahu Shapira, Portland, OR (US)

(73) Assignee: Webtrends, Inc., Portland, OR (US)

( * ) Notice: Subject to any disclaimer, the term of this patent is extended or adjusted under 35 U.S.C. 154(b) by 283 days.

This patent is subject to a terminal disclaimer.

(21) Appl. No.: 12/534,734

(22) Filed: Aug. 3, 2009

(65) Prior Publication Data

US 2009/0293001 A1 Nov. 26, 2009

Related U.S. Application Data

(63) Continuation of application No. 10/053,541, filed on Nov. 2, 2001, now abandoned.

(60) Provisional application No. 60/245,553, filed on Nov. 2, 2000.

(51) Int. Cl.
*G06F 15/173* (2006.01)
*G06F 15/16* (2006.01)
*G06F 3/00* (2006.01)
*G06F 9/44* (2006.01)

(52) U.S. Cl. ......... 709/223; 709/203; 715/745; 717/115

(58) Field of Classification Search ............. 709/203, 709/223; 715/745; 717/115
See application file for complete search history.

(56) References Cited

U.S. PATENT DOCUMENTS

| 5,848,396 | A | 12/1998 | Gerace |
| 5,991,740 | A | 11/1999 | Messer |
| 5,999,971 | A | 12/1999 | Buckland |
| 6,055,573 | A | 4/2000 | Gardenswartz et al. |

(Continued)

FOREIGN PATENT DOCUMENTS

WO WO0013373 3/2000

(Continued)

OTHER PUBLICATIONS

European Patent Office, Supplementary European Search Report, Oct. 26, 2005.

(Continued)

*Primary Examiner* — Ranodhi Serrao
(74) *Attorney, Agent, or Firm* — Marger Johnson & McCollom, P.C.

(57) ABSTRACT

A method and apparatus for tracking and reporting traffic activity on a web site whereby cookie data is compiled at the visitor computer using cookie processing script embedded within the web page downloaded over the Internet and operable on the visitor computer. Data mining code within the downloaded web page is operable on the visitor computer to obtain web browsing data. The cookie processing script operates in consideration of this web browsing data and an old cookie previously stored on the visitor computer and associated with the visited web page to obtain new cookie values. These new cookie values are then stored on the visitor computer and also attached to an image request sent to a data collection server where they are processed and posted for viewing by the web page owner. As cookie processing and writing occurs completely within the visitor computer, cookie-blocking technologies are circumvented.

4 Claims, 5 Drawing Sheets

U.S. PATENT DOCUMENTS

| | | | |
|---|---|---|---|
| 6,070,185 A * | 5/2000 | Anupam et al. | 709/204 |
| 6,073,138 A | 6/2000 | de l'Etraz et al. | |
| 6,081,788 A | 6/2000 | Appleman et al. | |
| 6,085,224 A * | 7/2000 | Wagner | 709/203 |
| 6,101,486 A | 8/2000 | Robert et al. | |
| 6,112,240 A | 8/2000 | Pogue et al. | |
| 6,201,996 B1 * | 3/2001 | Crater et al. | 700/9 |
| 6,223,215 B1 * | 4/2001 | Hunt et al. | 709/217 |
| 6,327,609 B1 * | 12/2001 | Ludewig et al. | 709/203 |
| 6,330,566 B1 | 12/2001 | Durham | |
| 6,374,359 B1 | 4/2002 | Shrader et al. | |
| 6,405,195 B1 | 6/2002 | Ahlberg | |
| 6,735,691 B1 | 5/2004 | Capps et al. | |
| 6,810,395 B1 | 10/2004 | Bharat | |
| 6,839,680 B1 | 1/2005 | Liu et al. | |
| 2002/0040395 A1 | 4/2002 | Davis et al. | |
| 2003/0188262 A1 * | 10/2003 | Maxwell et al. | 715/507 |

FOREIGN PATENT DOCUMENTS

| | | |
|---|---|---|
| WO | 0025224 | 5/2000 |

OTHER PUBLICATIONS

Richard M. Smith, "The Web Bug FAQ", Nov. 11, 1999, pp. 1-3.
M.Kohntopp/K.Kohntopp, "Datenspuren im Internet", Apr. 2000, pp. 248-257.
E. Schonberg, et al., "Measuring Success", Aug. 2000, pp. 53-57.

* cited by examiner

SYSTEM AND METHOD FOR GENERATING AND REPORTING COOKIE VALUES AT A CLIENT NODE

CROSS-REFERENCES TO RELATED APPLICATIONS

This application is a continuation of U.S. patent application Ser. No. 10/053,541, filed on Nov. 2, 2001, and claims the benefit of U.S. Provisional Patent Application No. 60/245,553 filed Nov. 2, 2000 the disclosure of which is incorporated herein in its entirety by reference.

BACKGROUND OF THE INVENTION

1. Field of the Invention

The present application relates to compiling and reporting data associated with activity on a network server and more particularly to generating and processing cookies directly on a client node to report web traffic data from the client node to a server responsible for compiling such data.

2. Description of the Prior Art

Programs for analyzing traffic on a network server, such as a worldwide web server, are known in the art. One such prior art program is described in U.S. patent application Ser. No. 09/240,208, filed Jan. 29, 1999, owned by applicant for the present invention, for a Method and Apparatus for Evaluating Visitors to a Web Server, which is incorporated herein by reference for all purposes. In these prior art systems, the program typically runs on the web server that is being monitored. Data is compiled, and reports are generated on demand—or are delivered from time to time via email—to display information about web server activity, such as the most popular page by number of visits, peak hours of website activity, most popular entry page, etc.

Analyzing activity on a worldwide web server from a different location on a global computer network ("Internet") is also known in the art. To do so, a provider of remote web-site activity analysis ("service provider") generates JavaScript code that is distributed to each subscriber to the service. The subscriber copies the code into each web-site page that is to be monitored. When a visitor to the subscriber's web site loads one of the web-site pages into his or her computer, the JavaScript code collects information, including time of day, visitor domain, page visited, etc. The code then calls a server operated by the service provider—also located on the Internet—and transmits the collected information thereto as a URL parameter value. Information is also transmitted in a known manner via a cookie received from the third party web tracking service.

Each subscriber has a password to access a page on the service provider's server. This page includes a set of tables that summarize, in real time, activity on the customer's web site.

Turning now to FIG. 1, indicated generally at 10 is a highly schematic view of a portion of the Internet implementing the present invention. Included thereon is a worldwide web server 12. Server 12, in the present example, is operated by a business that sells products via server 12, although the same implementation can be made for sales of services via the server. The server includes a plurality of pages that a site visitor can download to his or her computer, like computer 14, using a conventional browser program running on the computer. Examples of the type of pages that a visitor can download include informational pages and pages that describe the business and the products or services that are offered for sale.

As mentioned above, it would be advantageous to the seller to have an understanding about how customers and potential customers use server 12. As also mentioned above, it is known to obtain this understanding by analyzing web-server log files at the server that supports the selling web site. It is also known in the art to collect data over the Internet and generate activity reports at a remote server.

When the owner of server 12 first decides to utilize a remote service provider to generate such reports, he or she uses a computer 16, which is equipped with a web browser, to visit a web server 18 operated by the service provider. On server 18, the subscriber opens an account and creates a format for real-time reporting of activity on server 12.

To generate such reporting, server 18 provides computer 16 with a small piece of code, typically JavaScript code. The subscriber simply copies and pastes this code onto each web page maintained on server 12 for which monitoring is desired. When a visitor from computer 14 (client node) loads one of the web pages having the embedded code therein, the code passes predetermined information from computer 14 to a server 20—also operated by the service provider—via the Internet. This information includes, e.g., the page viewed, the time of the view, the length of stay on the page, the visitor's identification, etc. Server 20 in turn transmits this information to an analysis server 22, which is also maintained by the service provider. This server analyzes the raw data collected on server 20 and passes it to a database server 24 that the service provider also operates.

When the subscriber would like to see and print real-time statistics, the subscriber uses computer 16 to access server 18, which in turn is connected to database server 24 at the service provider's location. The owner can then see and print reports, like those available through the webtrendslive.com reporting service operated by the assignee of this application, that provide real-time information about the activity at server 12.

The above-described arrangement for monitoring web server activity by a service provider over the Internet is generally known in the art. Information analyzed in prior art systems generally consists of what might be thought of as technical data, such as most popular pages, referring URLs, total number of visitors, returning visitors, etc.

One known method for implementing this service is to load cookies on the computer of the visitor to the web page, where the cookies contain state information identifying that visitor (such as a unique visitor ID) and other information associated with that visitor (such as how many times the visitor has visited the particular web site). Despite the useful features that cookies provide to a user, there has been a recent backlash against using cookies as a perceived invasion of privacy. Modern web browsers now have a feature that allows a user to block all cookies and/or block cookies originating from third party web sites. This feature defeats the ability of web traffic analysis service providers from obtaining the information it needs to serve its customers.

Accordingly, the need remains for a way to still use cookies to obtain web site visitor data in the face of certain blocking features included in modern web browsers.

SUMMARY OF THE INVENTION

A method and apparatus is disclosed for setting cookie values from the client browser. Cookie values are read and written from the client browser and then sent to a processor on another computer. This process is used to avoid the alerts generated by web browsers when third-party (out of domain) cookies are accessed.

Cookie values such as the unique UserID values assigned to name-value pairs have traditionally been generated according to an algorithm stored at a cookie server and then transmitted to the client node for storage on the visitor's computer hard drive. The new IE 5.5 feature would block this process. The present invention instead embeds all cookie generating and processing algorithms within the JavaScript of the web pages sent to the client node. Such code adds about ten kilobytes of data to the web page file size and thus would not unduly affect the download time to the visitor computer.

The cookie is first read from a script that included in the web page code downloaded from a server coupled to the visitor computer over a wide area network such as the Internet. The same script then processes the data as fully as it can. Operation of the script then causes the computer to write new values back into the cookie and replace the old cookie values with the new values on the visitor computer hard drive. The script builds a string of all the data it has acquired and then passes it to a server by embedding the information into a request for an image.

The foregoing and other objects, features and advantages of the invention will become more readily apparent from the following detailed description of a preferred embodiment of the invention that proceeds with reference to the accompanying drawings.

Figure 1:
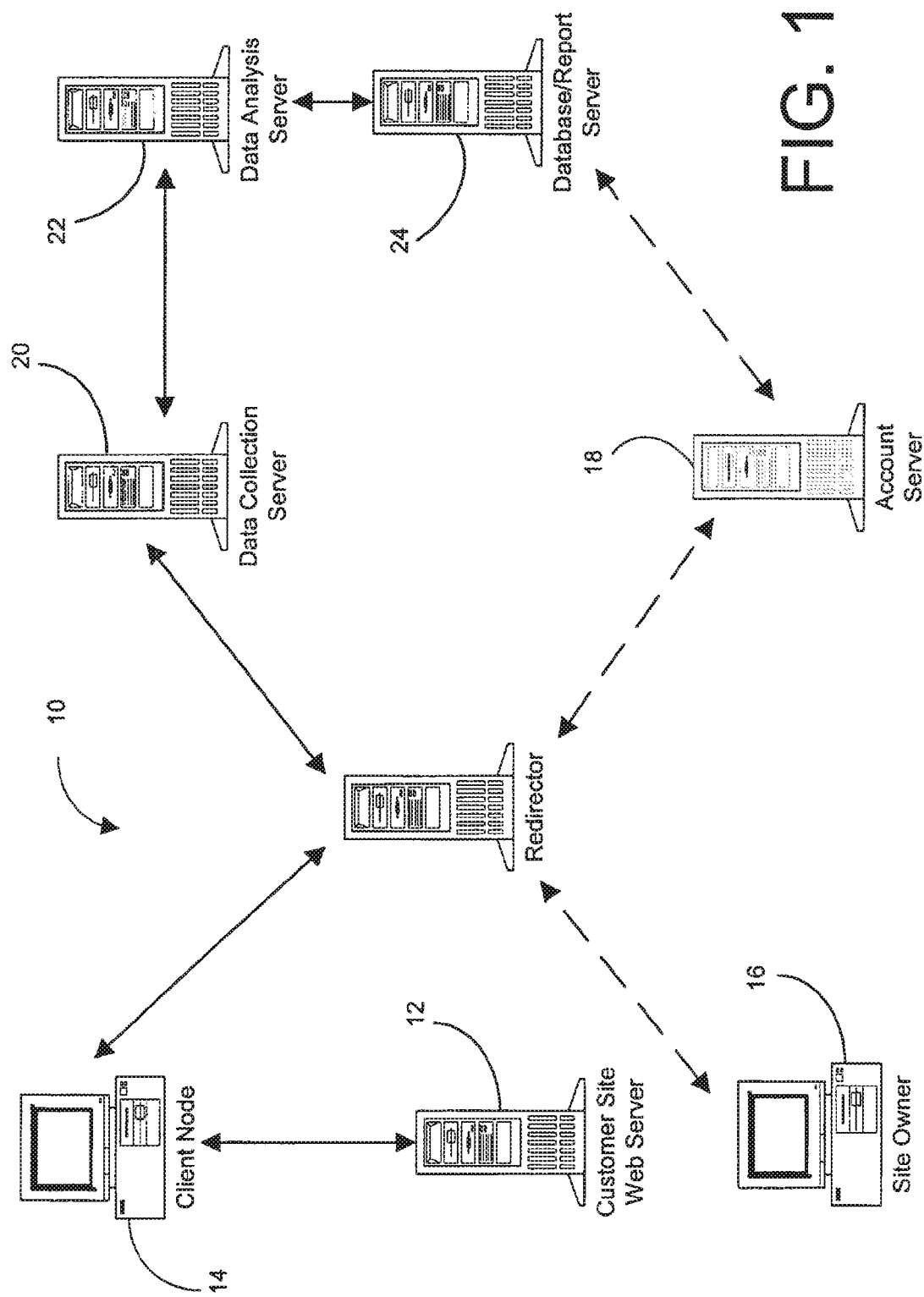
FIG. 1 is a schematic view of a portion of the Internet on which the invention is operated.

APPENDIX A shows exemplary computer code used within a web page to implement the invention.

DETAILED DESCRIPTION

The description first includes a technical description of cookies and how such are used in web sites to track visitors, and then proceeds with how the present invention operates to allow visitor tracking in view of current technology developed to block third-party cookies.

What are Cookies?

A cookie is a piece of text that a web server can store on a user's hard disk. Cookies allow a web site to store information on a user's machine and later retrieve it. The pieces of information are stored as "name-value pairs" comprised of, for instance, a variable name (e.g. UserID) and a value (e.g. A9A3BECE0563982D) associated with that variable name.

Taking the web browser Microsoft Internet Explorer as an example, cookies are typically stored on a machine running Window 9x in a directory called c:\windows\cookies. The directory may list a vast number of name-value pairs, each associated with a particular domain from which they originated, representing all of the web sites that has placed a cookie on that particular computer. An example of a cookie file is shown below:

| UserID | A9A3BECE0563982D | www.goto.com/ |
| --- | --- | --- |

The cookie above is typical of the type stored on a visitor's computer (hereinafter the client node) when visiting the web site located at the domain goto.com. The name of the name-value pair is UserID, and the value is A9A3BECE0563982D. Both the name and value of the pair are generated according to an algorithm programmed in the cookie server associated with the domain web site. The first time the client node browses the goto.com web site, software on that web site assigns a unique ID number for each visitor and instructs the browser on the client node to store the name-value pair as a cookie in a designated folder where it can be retrieved later. The same name-value pair data is stored on the goto.com cookie server along with other information so that the visitor can be identified later.

Cookies operate according to an industry standard called "Cookie RFC" (request for comment).

A more complicated example of a cookie is shown below in reference to the eCommerce web site amazon.com. Visits to the amazon.com web site result in the storage of a more comprehensive set of information on the client node visiting the web site. The resulting cookie from such a visit is comprised of the following "crumbs":

Session-id-time 954242000 amazon.com/
Session-id 002-4135256-7625846 amazon.com/
x-main eKQIfwnxuF7qtmX52x6VWAXh@ih6Uo5H amazon.com/
ubid-main 077-9263437-9645324 amazon.com/

Each of these portions of the cookie, or "crumbs", is associated with the amazon.com domain. Based on these crumbs, it appears that amazon.com stores a main user ID, an ID for each session, and the time the session started on the visitor computer (as well as an x-main value, which could be anything). While the vast majority of sites store just one piece of information—a user ID—on a visitor computer, there is really no limit to the amount of information such sites can store on the visitor computer in name-value pairs.

How Does Cookie Data Move?

A name-value pair is simply a named piece of data. It is not a program, and it cannot "do" anything. A web site can retrieve only the information that it has placed on the client node computer. It cannot retrieve information from other cookie files, or any other information from your machine.

The data moves in the following manner. If one were to type the URL of a web site into a computer browser, the browser sends a request to the web site for the page. For example, if one were to type the URL http://www.amazon.com into the browser, the browser will contact Amazon's server and request its home page. When the browser does this, it will look on the requesting machine for a cookie file that Amazon has set. If it finds an Amazon cookie file, the browser will send all of the name-value pairs in the file to Amazon's server along with the URL. If it finds no cookie file, it will send no cookie data. Amazon's web server receives the cookie data and the request for a page. If name-value pairs are received, Amazon can use them.

If no name-value pairs are received, Amazon knows that the visitor operating that computer has not visited before. The server creates a new ID for that visitor in Amazon's database and then sends name-value pairs to the computer in the header for the web page it sends. The computer stores the name-value pairs on its hard disk drive according to the Cookie RFC protocol.

The web server can change name-value pairs or add new pairs whenever you visit the site and request a page.

There are other pieces of information that the server can send with the name-value pair. One of these is an expiration date. Another is a path so that the site can associate different cookie values with different parts of the site.

How Do Web Sites Use Cookies?

Cookies evolved because they solve a big problem for the people who implement web sites. In the broadest sense, a cookie allows a site to store state information on a visitor's computer. This information lets a web site remember what state the browser is in. An ID is one simple piece of state information—if an ID exists on the visiting computer, the site knows that the user has visited before. The state is, "Your browser has visited the site at least one time," and the site knows the user ID from that visit.

Web sites use cookies in many different ways. For instance, sites can accurately determine how many readers actually visit the site, which are new as opposed to repeat visitors, and how often each visitor has visited the site. It turns out that because of proxy servers, caching, concentrators and so on, the only way for a site to accurately count visitors is to set a cookie with a unique ID for each visitor. The way the site does this is by using a database. The first time a visitor arrives, the site creates a new ID in the database and sends the ID as a cookie. The next time the user comes back, the site can increment a counter associated with that ID in the database and know how many times that visitor returns.

Sites can also store user preferences so that the site can look different for each visitor (often referred to as customization). For example, if one were to visit msn.com, it offers the visitor the ability to change content/layout/color. It also allows one to enter a zip code and get customized weather information. When the zip code is entered, the following name-value pair is an example of what might be added to MSN's cookie file:

| WEAT | CC=NC%5FRaleigh%2DDurham ®ION= | www.msn.com/ |
|---|---|---|

It is apparent from this name-value pair that the visitor is from Raleigh, N.C. Most sites seem to store preferences like this in the site's database and store nothing but an ID as a cookie, but storing the actual values in name-value pairs is another way to do it.

ECommerce Sites can implement things like shopping carts and "quick checkout" options. The cookie contains an ID and lets the site keep track of a visitor as the visitor adds different things to his or her "shopping cart." Each item added is stored in the site's database along with the visitor's ID value. When the visitor checks out, the site knows what is in his or her cart by retrieving all of the selections from the database associated with that user or session ID. It would be impossible to implement a convenient shopping mechanism without cookies or something like it.

In all of these examples, note that what the database is able to store is things the visitor has selected from the site, pages viewed from the site, information given to the site in online forms, etc. All of the information is stored in the site's database, and a cookie containing your unique ID is all that is stored on the client node 14 (FIG. 1) in most cases.

Figure 2:
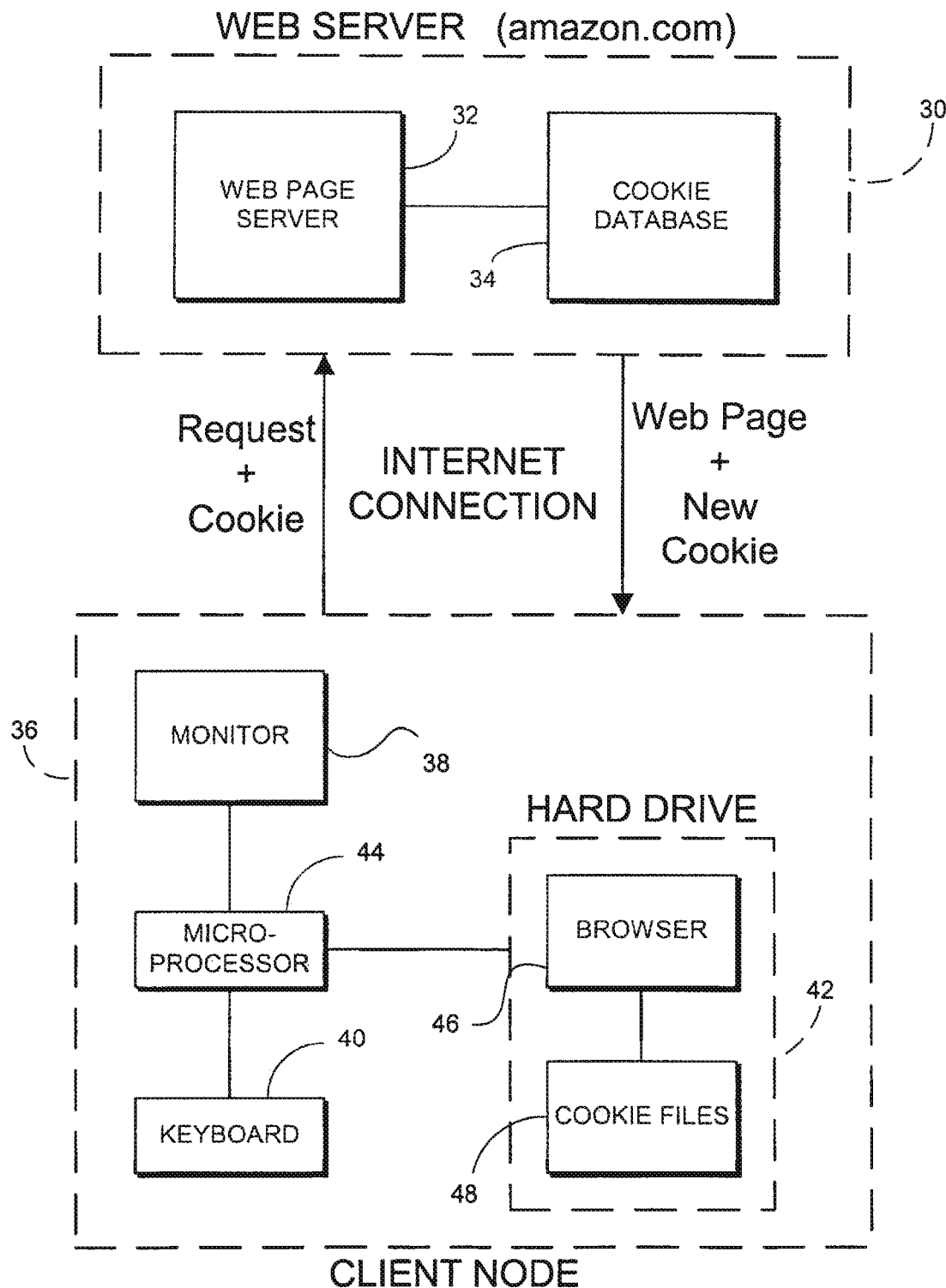
FIG. 2 is a block diagram illustrating the interaction between a web page server and a client node during web page request transactions according to methods known in the art.

An illustration of this interaction between a visitor's computer (client node) and the web server is shown in FIG. 2. The web server 30 includes a web page server 32 that stores and distributes, on request, web pages associated with a designated domain. The web server also includes a cookie database 34 that stores information about individual visitors to the web pages served by the web page server as described above.

The client node 36, shown in FIG. 2 as a computer of the web page visitor, includes components typical to computers such as a monitor 38, keyboard input device 40, a hard drive storage device 42 and a microprocessor 44. The client node also includes an input/output device capable of being connected to the Internet such as an analog modem (not shown). The hard drive has stored on it a browser software program 46 that runs on the microprocessor, and a set of cookie files 48 that are stored by operation of the instructions from the web server to the browser as described above.

The client node 36 makes a request for a web page that is directed to the web page server 32. If a cookie associated with the same domain as the web page requested is stored on the client node hard drive, then that cookie is also sent with the request. The web server 30 receives the request for the web page and sends the requested web page back to the client node along with a new cookie that, as in the case of the amazon.com site, stores additional name-pair data within the client node cookie files 48. The same information is typically reflected within the cookie database 34 of the web server 30.

A recent issue with cookies is the perceived invasion of privacy. Cookies allow sites to gather visitor information like never before. Certain infrastructure providers can actually create cookies that are visible on multiple sites. These providers typically fall into one of two categories: web advertisement services and web tracking services.

The most famous of the former is DoubleClick, Inc. Many companies use DoubleClick to serve ad banners on their sites. Ad banners are typically graphic image files (GIF) located within the web page that display the advertisement. Code within the web site requests the image directly from the Ad provider's servers. This allows the Ad provider to load cookies on your computer. Ad providers like DoubleClick can then track your movements across multiple sites and thus form a very rich profile of the user at the client node. These profiles are still anonymous, but they are rich.

Figure 3:
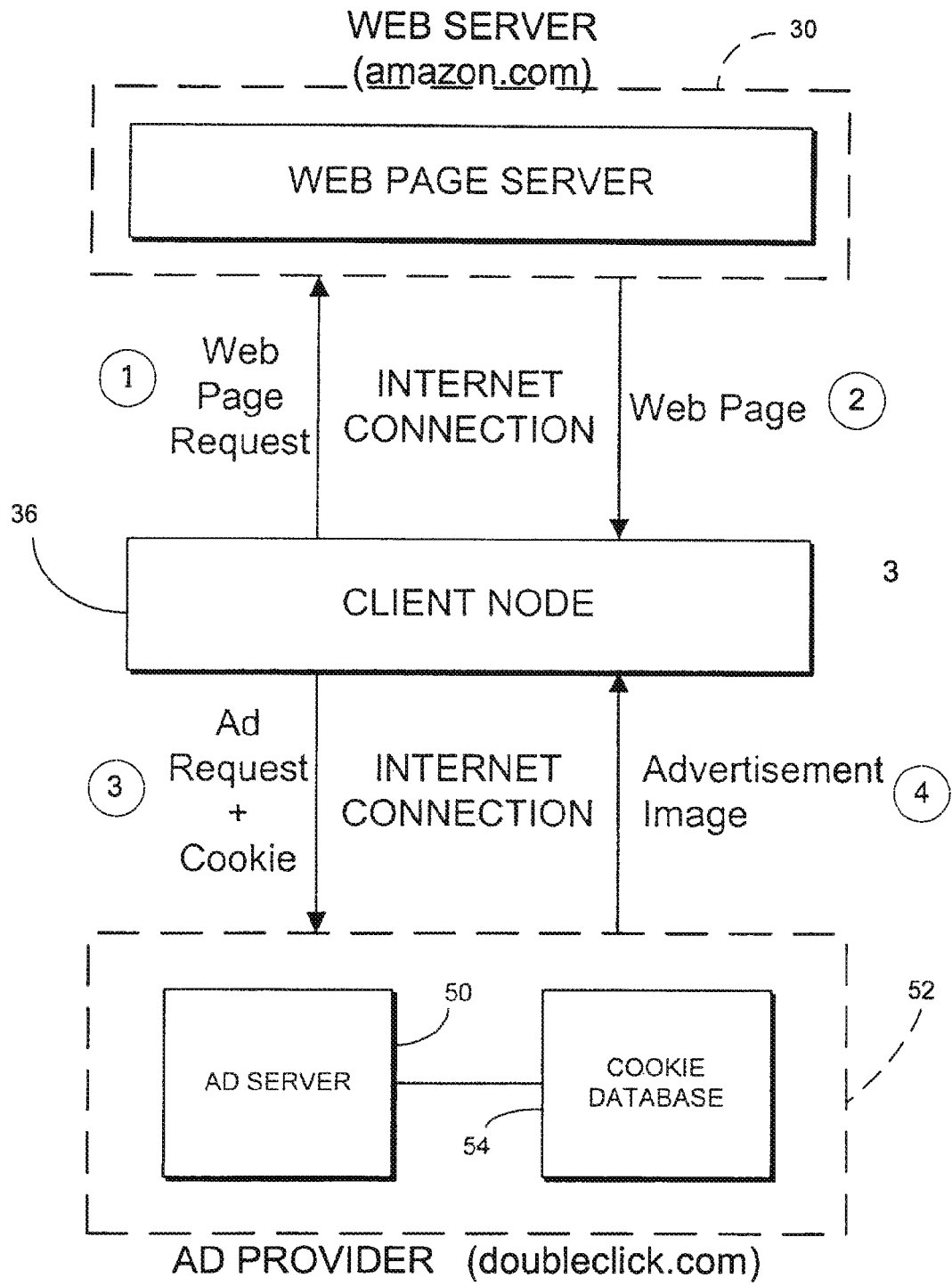
FIG. 3 is a block diagram illustrating the interaction between a web page server, a client node, and a third party advertisement server during web page request transactions according to methods known in the art.

FIG. 3 illustrates how a client node receives web pages from a visited web site such as amazon.com but sends requests for and receives advertising images from a third party such as doubleclick.com. The client node 36 first sends a web page request in step (1) for a web page associated with a particular domain. The web server 30 associated with that domain receives the request and serves the web page back to the client node in step (2). As above, additional cookie data can pass between the client node and the web server. Located on that web page is code that calls for additional images (typically paid advertisements) stored at an advertisement server 50 (e.g. at the domain doubleclick.com) different than the web server 30. A cookie, placed on the client node in a previous visit, is sent to the ad provider 52 together with the request for the image in step (3). The cookie is analyzed and processed at the cookie database 54 of the ad provider and the ad server sends the advertisement image to the client node 36 in step (4) for display as part of the originally requested web page.

Figure 4:
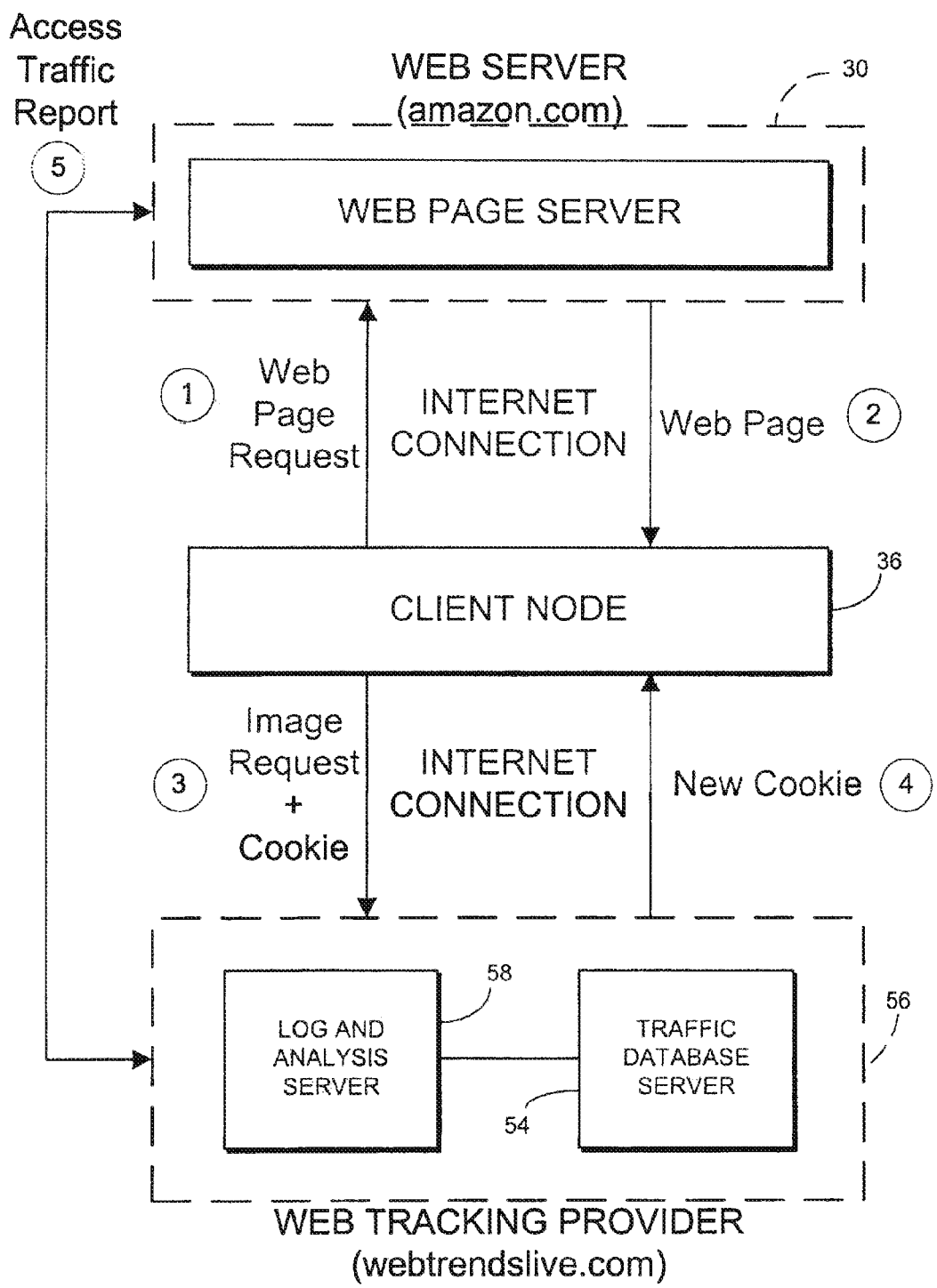
FIG. 4 is a block diagram illustrating the interaction between a web server, a client node, and a third party visitor tracking server during web page request transactions according to methods known in the art.

A web tracking provider (illustrated in FIG. 4) operates on a similar principal but typically serves a passive role of collecting statistics and does not provide advertisement images for another entity's web site. Instead of serving an advertisement image, for instance, the web-tracking provider 56 provides new cookie information in step (4) to the client node 36. The image requested is typically only a 1×1 pixel image that is too small to be viewed by the naked eye and simply acts as a carrier on which tracking information is sent to the log analysis server 58 of the web-tracking provider. A new cookie is generated and sent to the client node. Visitor information is stored in a database 60 that can then be accessed by the web server 30 operator to see the popularity and demographics of the visitors to his or her web site.

Recently, computer users have been concerned that profile information gathered by such firms as DoubleClick would be linked to name and address information. This has been perceived by many people as spying and has resulted in the implementation of several cookie-blocking techniques. The Microsoft Internet Explorer browser, for instance, has for many years included a feature whereby a user can elect to block access to all cookies at his or her machine (client node). Selecting such a feature eliminates all of the advantages that cookies provide such as personalized web content pages, storing of user preferences, etc.

To allow a user to take advantage of cookies from web pages with which the visitor is directly interacting while still addressing privacy concerns, Microsoft has recently implemented a new feature in IE 5.5 that allows cookies from such sites to be used but blocks (or alerts the user to) third party cookies such as those from DoubleClick. The present invention, a preferred implementation of which is described below, is intended to circumvent this feature.

The Invention

Cookie values such as the unique UserID values assigned to name-value pairs have traditionally been generated according to an algorithm stored at a cookie server and then transmitted to the client node for storage on the visitor's computer hard drive. The new IE 5.5 feature would block this process. The present invention instead embeds all cookie generating and processing algorithms within the JavaScript of the web pages sent to the client node. Such code adds about ten kilobytes of data to the web page file size.

Figure 5:
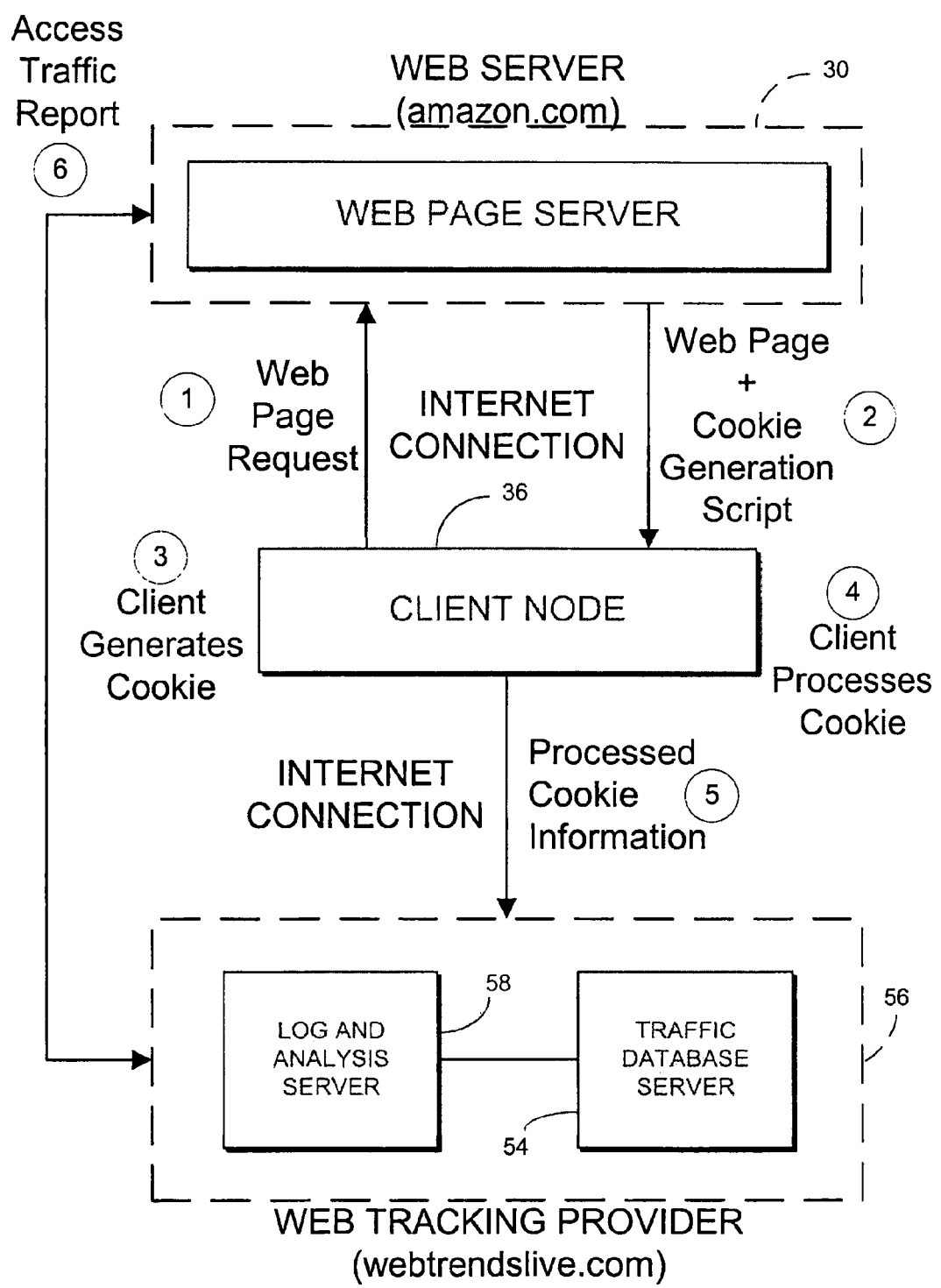
FIG. 5 is a block diagram illustrating the interaction between a web server, a client node, and a third party visitor tracking server during web page request transactions according to a preferred embodiment of the invention.

The illustration in FIG. 5 shows, at a high level, how the invention operates. The visitor makes a web page request in step (1) by typing in a URL into a browser program operating on the client node 36. The URL has a domain (such as amazon.com) that points it toward a particular web server 30 located on the Internet. That web server is the device on which the web site is stored. The web site is constructed using a html or JavaScript code including the original web page code (including text and images), data mining code, and additional cookie processing code supplied by the web tracking provider that performs the functions described in more detail below to establish and process a cookie right on the client node without additional interaction with the web tracking provider.

Once the request for the web page is received at the web server, the web page and cookie generation script embedded within the web page are sent back to the client node 36 in step (2). As the browser on the client node runs the script of the web page to display it on the client node monitor, the additional script is implemented to search for a cookie, generate a new cookie in step (3), and then process the cookie in step (4) to extract and then send in step (5) the information embedded therein to the web tracking provider. The information reflects the data collected from the client node and web page visiting session. The web server operator may access databases within the web tracking provider server 58 to look-up traffic information for specific web sites in step (6).

As the web page loads via the browser at the client node, the script accompanying the web page operates to:
 (1) Search for a cookie associated with a particular domain—such as webtrendslive.com/. The following is an example of a JavaScript code string (the function RCook) embedded within the web page script and operable to read the cookie:

```
//===========================
function RCook( )
{
  var k, c, i, s, e, v;
  for( i=0; i<25; i++)
  {
    Cook[i] = "";
  }
  k= "WTL"+siteid+"=";
  c= document.cookie;
  s= c.indexOf( k);
  if( s >= 0)
  {
    s+= k.length;
    e= c.indexOf( ";", s);
    v= (e==-1) ? c.substr( s) : c.substring( s, e);
    Cook= v.split("&");
    for( i in Cook)
    {
      Cook[i] = unescape(Cook[i]);
    }
  }
}
//===========================
```

(2) If no cookie exists, then the script generates and then saves a cookie to the cookie file. An example of the subroutine script used for storing or writing the cookie (the function WCook) is shown below:

```
//===========================
function WCook( )
{
  var c, i;
  c= "WTL"+siteid+"=";
  for( i in Cook)
  {
    c+= (i==0?"":"&") + escape(Cook[i]);
  }
  c+= ";path=/;expires=" + new Date(t.getTime( )+31536000000) + ";";
  document.cookie= c;
}
//===========================
```

(3) If a cookie exists, then the script reads the cookie stored on the client node, processes the cookie based on the values read and the new events that have occurred, and replaces the cookie with new values. An example of the subroutine script used for writing the new cookie values is shown below:

```
//===========================
X("LastDate",wtT(Cook[3]));
Cook[3] = t.getTime( );
X("LastUrl1",Cook[4]));
X("LastUrl2",Cook[5]));
X("LastUrl3",Cook[6]);
X("LastUrl4",Cook[7]);
Cook[7] = Cook[6];
Cook[6] = Cook[5];
Cook[5] = Cook[4];
Cook[4] = Url;
//===========================
``` where cookie values can be expanded to include the following information:

```
//===========================
if(nv)
{
    Cook[8] = t.getTime( );
    Cook[9] = url;
    Cook[10] = ref;
}
X("VisitDate",wtT(Cook[8]));
X("VisitUrl",Cook[9]);
X("VisitRef",Cook[10]);
//===========================
if( Cook[11] =="") Cook[11] = 0;
if( nv) Cook[11] = parseInt(Cook[11])+1;
X("NumVisit",Cook[11]);
if( Cook[12] =="") Cook[12] = 0;
Cook[12] = nv ? 1 : parseInt(Cook[12])+1;
X("PageDepth",Cook[12]);
//===========================
if( Cook[13] =="") Cook[13] = 0;
if( of) Cook[13] = parseInt(Cook[13])+1;
X("NumOrder",Cook[13]);
X("FirstOrderDate",wtT(Cook[14]));
if( of && ford) Cook[14] = t.getTime( );
X("FirstOrderUrl",Cook[15]);
if( of && ford) Cook[15] = Cook[9];
X("FirstOrderRef",Cook[16]);
if( of && ford) Cook[16] = Cook[10];
X("LastOrderDate",wtT(Cook[17]));
if( of) Cook[17] = t.getTime( );
X("LastOrderUrl",Cook[18]);
if( of) Cook[18] = Cook[9];
X("LastOrderRef",Cook[19]);
if( of) Cook[19] = Cook[10];
//===========================
if( gf)
{
    var F= new Array( );
    for( i=0; i<3; i++)
    {
        F[i] = "";
    }
    //=================
    G= Cook[20].split("|");
    for( i=0; i< G.length; i++)
    {
        var F1= G[i].split(",");
        if( F1[0] == escape(CONTENTGROUP))
        {
            F[0] = F1[0];
            F[1] = F1[1];
            F[2] = F1[2];
            break;
        }
    }
    //=================
}
```

(4) The processed information from the previous step is built as a string of all of the data that it has acquired (such as visitor sessions, path, browser type, screen resolution, eCommerce, time spent on page, etc.) and attaches the data to an image request made to the web infrastructure service provider (e.g. ad servers or visitor tracking services). An example of code used to implement this function is included below:

```
//===========================
window.document.wtImg.src = "button5.asp?"+W
}
var personal = 0
if (personal)
{
    wtTag( );
}
else
{
    //Capture their load and unload then overload the functions
    var theirLoad = window.onload;
    window.onload = wtLoad;
}
//-->
</SCRIPT>
//===========================
``` where the image request placeholder is included within the script as:

```
document.write('<A TARGET= "_blank"
HREF="http://www.webtrendslive.com/redirect.asp?siteID=19042">
');
document.write('<IMG NAME="wtImg" BORDER="0" WIDTH="100"
HEIGHT="100" SRC="">');
document.write('</A>');
```

By setting the source of the image to a variable built by the script (e.g. www.webtrendslive.com/button3. asp? id39786c 45629t120045), all the gathered information can be passed to the web server doing the logging, e.g. data collection server 20 (FIG. 1). In this case, for instance, the variable script "id39786c45629t120045" is sent to a location such as incorporated within applicants' webtrendslive.com web site and is interpreted by a decoder program built into the data analysis server 22 to mean that a user with ID #39786, loaded client web site #45629 in 4.5 seconds and spent 1:20 minutes there before moving to another web site.

A sample of the complete code used to implement the invention is included in Appendix A.

An advantage of the present invention is that all cookie reading and rewriting processes take place on the client node and no cookies get sent over the Internet. Accordingly, important information about the client node can still be mined and sent to a third party site that can accumulate and analyze such information without being affected by the cookie blocking features of such modem browsers as IE 5.5.

Having described and illustrated the principles of the invention in a preferred embodiment thereof, it should be apparent that the invention can be modified in arrangement and detail without departing from such principles. We claim all modifications and variation coming within the spirit and scope of the following claims.

APPENDIX A (Client-Based Cookie Generation)

```
<script LANGUAGE="javascript">
<!--
var startTime = new Date( );
//-->
</script>
```

APPENDIX A-continued (Client-Based Cookie Generation)

```javascript
<SCRIPT LANGUAGE="JavaScript">
<!--
var loadTime;
document.write('<A TARGET= "_blank"
HREF="http://www.webtrendslive.com/redirect.asp?siteID=19042">');
document.write('<IMG NAME="wtImg" BORDER="0" WIDTH="100" HEIGHT="100"
SRC="">');
document.write('</A>');
//Overloaded load function
function wtLoad( )
{
  // run the code from their load function
  if (window.theirLoad != null) theirLoad( );
  //Trap and compute the load time
  if (typeof(startTime)=="object")
  {
    var endTime = new Date( );
    loadTime = (endTime−startTime)/1000;
  }
  wtTag( );
}
function wtTag( )
{
  var siteid= "2778";
  var t= new Date( );
  var url=window.document.URL;
  var ref=window.document.referrer;
  var day1 = 0;
  var util;
  var NewVisitInterval = 1800000;
  //==========================
  var Cook= new Array( );
  //==========================
  function RCook( )
  {
    var k, c, i, s, e, v;
    for( i=0; i<25; i++)
    {
      Cook[i] = "";
    }
    k= "WTL"+siteid+"=";
    c= document.cookie;
    s= c.indexOf( k);
    if( s >= 0)
    {
      s+= k.length;
      e= c.indexOf( ";", s);
      v= (e==−1) ? c.substr( s) : c.substring( s, e);
      Cook= v.split("&");
      for( i in Cook)
      {
        Cook[i] = unescape(Cook[i]);
      }
    }
  }
  //==========================
  function WCook( )
  {
    var c, i;
    c= "WTL"+siteid+"=";
    for( i in Cook)
    {
      c+= (i==0?"":"&") + escape(Cook[i]);
    }
    c+= ";path=/;expires=" + new Date(t.getTime( )+31536000000) +
";";
    document.cookie= c;
  }
  //==========================
  function X(n,v)
  {
    W+="&"+n+"="+escape(v);
  }
  //==========================
  function wtBuildInts(d1,d2)
  {
    var nw = (wtW(d1,d2,day1)) ? 1 : 0;
    if (d1.getFullYear( )>d2.getFullYear( )) return "11" + nw + "11";
```

APPENDIX A-continued (Client-Based Cookie Generation)

```
    else if (d1.getMonth( )>d2.getMonth( )) return "01" + nw + "11";
    else if (nw) return "00" + nw + "11";
    else if (d1.getDate( )>d2.getDate( )) return "00" + nw + "11";
    else if (d1.getHours( )>d2.getHours( )) return "00" + nw + "01";
    else return "00000"
}
//===========================
function wtT(t1)
{
    var t;
    if( t1=="") return "";
    t= new Date( parseInt(t1));
    return
t.getFullYear( )+","+(t.getMonth( )+1)+","+t.getDate( )+","+t.getHours( )+","+t.-
getMinutes( )+","+t.getSeconds( )+","+t.getDay( )+","+t.getTimezoneOffset( );
}
//===========================
function wtW(nd,od,d1)
{
    var os = (od.getDay( )<d1) ? 7−(d1-od.getDay( )) : od.getDay( )−
d1;
    var bw = new Date(od.getFullYear( ),od.getMonth( ),od.getDate( )−
os,0,0,0);
    var nw = new Date(bw.getTime( ) + 604800000)
    return (nd > nw) ? 1 : 0
}
//===========================
W="tagver=3";
X("SiteId",siteid);
X("Tz","−800");
X("firstwkday","sunday");
X("Edition","personal");
X("Button","10");
X("server",SERVER);
X("order",ORDER);
X("Group",CONTENTGROUP);
X("browserDate",t);
X("title",document.title);
X("url",url);
X("referrer",ref);
X("appname",navigator.appName);
X("appversion",navigator.appVersion);
X("cookieOK",(navigator.cookieEnabled?"Yes":"No"));
X("userLanguage",(navigator.appName=="Netscape"?navigator.language:navigator.-
userLanguage));
X("platform",navigator.platform);
X("bgColor",document.bgColor);
if(typeof(screen)=="object")
{
    X("screenResolution",screen.width+"x"+screen.height);
    X("colorDepth",screen.colorDepth);
    X("javaOK",navigator.javaEnabled( )?"Yes":"No");
}
//===========================
RCook( );
//===========================
//Set flags
ft= Cook[0] =="" ? 1 : 0;
t1= Cook[3] =="" ? "" : new Date( parseInt(Cook[3]));
nv= t1=="" || (t.getTime( ) − t1.getTime( )) > NewVisitInterval ? 1 :
0;
of= ORDER==""? 0 : 1;
ford= Cook[14] =="" ? 1 : 0;
o1= Cook[14] =="" ? "" : new Date( parseInt(Cook[14]));
o2= Cook[17] =="" ? "" : new Date( parseInt(Cook[17]));
nord= o2=="" || (t.getTime( ) − o2.getTime( )) > NewVisitInterval ? 1 :
0;
v2= Cook[8] =="" ? "" : new Date( parseInt(Cook[8]));
gf= CONTENTGROUP==""? 0 : 1;
//===========================
X("ClientDate",wtT(t.getTime( )));
X("FirstDate",wtT(Cook[0]));
if( ft) Cook[0] = t.getTime( );
X("FirstUrl",Cook[1]);
if( ft) Cook[1] = url;
X("FirstRef",Cook[2]);
if( ft) Cook [2] = ref;
//===========================
```

APPENDIX A-continued (Client-Based Cookie Generation)

```
X("LastDate",wtT(Cook[3]));
Cook[3] = t.getTime( );
X("LastUrl1",Cook[4]);
X("LastUrl2",Cook[5]);
X("LastUrl3",Cook[6]);
X("LastUrl4",Cook[7]);
Cook[7] = Cook[6];
Cook[6] = Cook[5];
Cook[5] = Cook[4];
Cook[4] = url;
//===========================
if(nv)
{
   Cook[8] = t.getTime( );
   Cook[9] = url;
   Cook[10] = ref;
}
X("VisitDate",wtT(Cook[8]));
X("VisitUrl",Cook[9]);
X("VisitRef",Cook[10]);
//===========================
if( Cook[11] =="") Cook[11] = 0;
if( nv) Cook[11] = parseInt(Cook[11])+1;
X("NumVisit",Cook [11]);
if( Cook[12] =="") Cook[12] = 0;
Cook[12] = nv ? 1 : parseInt(Cook[12])+1;
X("PageDepth",Cook[12]);
//===========================
if( Cook[13] =="") Cook[13] = 0;
if( of) Cook[13] = parseInt(Cook[13])+1;
X("NumOrder",Cook[13]);
X("FirstOrderDate",wtT(Cook[14]));
if( of && ford) Cook[14] = t.getTime( );
X("FirstOrderUrl",Cook[15]);
if( of && ford) Cook[15] = Cook[9];
X("FirstOrderRef",Cook[16]);
if( of && ford) Cook[16] = Cook[10];
X("LastOrderDate",wtT(Cook[17]));
if( of) Cook[17] = t.getTime( );
X("LastOrderUrl",Cook[18]);
if( of) Cook[18] = Cook[9];
X("LastOrderRef",Cook[19]);
if( of) Cook[19] = Cook[10];
//===========================
if( gf)
{
   var F= new Array( );
   for( i=0; 1<3; i++)
   {
      F[i] = "";
   }
   //==================
   G= Cook[20].split("|");
   for( i=0; i< G.length; i++)
   {
      var F1= G[i].split(",");
      if( F1[0] == escape(CONTENTGROUP))
      {
         F[0] = F1[0];
         F[1] = F1[1];
         F[2] = F1[2];
         break;
      }
   }
   //==================
   if (F[1] =="")
      util=1111111;
   else
   {
      var d1 = new Date (parseInt(F[2]));
      if (d1>t) util=1111111;
      else util= "0" + ((t.getTime( ) – d1.getTime( )) >
NewVisitInterval ? "1" : "0").toString( ) + wtBuildInts(t,d1);
   }
   X("NewGroupSummary", util);
   X("FirstGroupDate", wtT(F[1]));
   if( F[1] =="") F[1] = t.getTime( );
   X("LastGroupDate", wtT(F[2]));
```

APPENDIX A-continued (Client-Based Cookie Generation)

```
    F[2] = t.getTime( );
    G[i] = escape(CONTENTGROUP) + "," + F[1] + "," + F[2];
    //===================
    var G1="";
    for( i in G)
    {
        G1+= (G1==""?"":"|") + G[i];
    }
    Cook[20] = G1;
  }
  //=========================
  if (ft)
      util = 1111111;
  else
  {
      if (t1>t) util=1111111;
      else util= "0" + ((t.getTime( ) – t1.getTime( )) >
NewVisitInterval ? "1" : "0").toString( ) + wtBuildInts(t,t1);
  }
  X("NewVisitSummary",util)
  if (ford)
      util = 1111111;
  else
  {
      if (o2>t) util=1111111;
      else util= "0" + ((t.getTime( ) – o2.getTime( )) >
NewVisitInterval ? "1" : "0").toString( ) + wtBuildInts(t,o2);
  }
  if (of) X("NewOrderSummary",util);
  //=========================
  if (of)
  {
      if (ford)
      {
          util = (t1=="")? 0 : Math.floor((t.getTime( )–
t1.getTime( )) / 1000)
          X("FirstSaleCycle",util)
          X("SaleCycle",util)
      }
      else
      {
          util = Math.floor((t.getTime( )–o2.getTime( )) / 1000)
          X("FirstSaleCycle",0)
          X("SaleCycle",util)
      }
  }
  util = (t1=="")? 0 : Math.floor((t.getTime( ) –t1.getTime( )) / 1000)
  X("VisitCycle",util)
  if (!personal) X("PageLoadTime",loadTime)
  //=========================
  WCook( );
  //=========================
  window.document.wtImg.src = "button5.asp?"+W
}
var personal = 0
if (personal)
{
  wtTag( );
}
else
{
  //Capture their load and unload then overload the functions
  var theirLoad = window.onload;
  window.onload = wtLoad;
}
//-->
</SCRIPT>
```

We claim:

1. A method for tracking and reporting traffic activity on a web site comprising the steps of:
- determining whether a cookie exists for the web site on a visitor computer;
- if no cookie exists on the visitor computer, then operating script from the web site on the visitor computer to create and load new cookie values on the visitor computer;
- if a cookie exists on the visitor computer with current cookie values, then operating script from the web site on the visitor computer to read the cookie stored on the visitor computer, processing the cookie based on the current cookie values and visitor activity on the web site to determine new cookie values, and replacing the current cookie values with the new cookie values;
- compiling the new cookie values into a data string; and
- returning the data string to a reporting computer.

2. The method of claim 1, further including the steps of:
- attaching the data string to an image request associated with a designated URL source associated with a domain different from a domain of the web site; and
- sending the image request to the URL source.

3. The method of claim 2, further including the step of decoding the data string to obtain the web browsing data.

4. The method of claim 2, further including the steps of:
- compiling the web browsing data into a web page traffic report; and
- posting the report for viewing over the wide area network.

* * * * *